(12) United States Patent
Ankney et al.

(10) Patent No.: US 10,824,830 B2
(45) Date of Patent: Nov. 3, 2020

(54) RFID CONTROL SURFACE DISCONNECT DETECTION SYSTEM

(71) Applicant: Hamilton Sundstrand Corporation, Charlotte, NC (US)

(72) Inventors: Darrell E. Ankney, Dixon, IL (US); Stephanie Gaspers, Loves Park, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 46 days.

(21) Appl. No.: 16/000,059

(22) Filed: Jun. 5, 2018

(65) Prior Publication Data
US 2019/0370509 A1   Dec. 5, 2019

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC .................. G06K 19/0716; G06K 19/0723
See application file for complete search history.

(56) References Cited

U.S. PATENT DOCUMENTS

| | | | |
|---|---|---|---|
| 6,483,436 B1 | 11/2002 | Emaci et al. | |
| 7,354,022 B2 * | 4/2008 | Richter | B64D 45/0005 244/194 |
| 7,921,729 B2 * | 4/2011 | Conner | B64D 45/0005 340/686.1 |
| 8,820,174 B2 * | 9/2014 | Carbone | G01L 1/04 73/783 |
| 10,216,167 B1 * | 2/2019 | Ankney | B64C 13/0425 |

(Continued)

FOREIGN PATENT DOCUMENTS

| | | |
|---|---|---|
| EP | 2447161 A2 | 5/2012 |
| EP | 2799335 A1 | 11/2014 |
| EP | 3381795 A1 | 10/2018 |

OTHER PUBLICATIONS

European Search Report for Application No. 19178391.9-1010, dated Oct. 10, 2019, 8 pages.

*Primary Examiner* — Thien M Le
*Assistant Examiner* — April A Taylor
(74) *Attorney, Agent, or Firm* — Cantor Colburn LLP

(57) ABSTRACT

A control surface disconnect detection system includes a mechanical disconnect detection device that includes: a first contact element; a second contact element; and a mechanical fuse that includes a conduction path. In a normal operational state the conduction path creates an electrical pathway between the first contact element and second contact element and when in a control surface disconnected state the conduction path does not create an electrical pathway between the first contact element and the second contact element. The system also includes a radio frequency identification (RFID) tag connected to the first contact element and the second contact element such that when the mechanical disconnect detection device is in the normal operation state the RFID tag does not transmit information, and when the mechanical disconnect detection device is in the control surface disconnected state the RFID tag does transmit information.

16 Claims, 8 Drawing Sheets

(56) References Cited

U.S. PATENT DOCUMENTS

| | | | |
|---|---|---|---|
| 2004/0059504 A1* | 3/2004 | Gray | G08G 5/0078 |
| | | | 701/301 |
| 2010/0055929 A1* | 3/2010 | Cain | B64D 15/12 |
| | | | 439/34 |
| 2010/0295694 A1* | 11/2010 | Kauffman | G06K 19/0716 |
| | | | 340/665 |
| 2012/0044092 A1 | 2/2012 | Shore et al. | |
| 2012/0104178 A1* | 5/2012 | Carbone | B64D 45/0005 |
| | | | 244/213 |
| 2013/0069676 A1 | 3/2013 | Steinwandel et al. | |
| 2015/0076283 A1* | 3/2015 | Schievelbusch | F02K 1/54 |
| | | | 244/99.3 |
| 2015/0116087 A1* | 4/2015 | Tucker | G01B 15/02 |
| | | | 340/10.1 |
| 2018/0284259 A1* | 10/2018 | Ankney | G01S 13/878 |

\* cited by examiner

RFID CONTROL SURFACE DISCONNECT DETECTION SYSTEM

BACKGROUND

Exemplary embodiments pertain to the art of actuator torque monitoring and, in particular, utilizing radio-frequency identification (RFID) to indicate over-torque conditions and to identify actuators where such conditions occurred.

Modern aircraft often use a variety of high lift leading and trailing edge devices to improve high angle of attack performance during various phases of flight, for example, takeoff and landing. One such device is a trailing edge flap. Current trailing edge flaps generally have a stowed position in which the flap forms a portion of a trailing edge of a wing, and one or more deployed positions in which the flap extends outwards and down to increase the camber and/or plan form area of the wing. The stowed position is genenrally associated with low drag at low angles of attack and can be suitable for cruise and other low angle of attack operations. The extended position(s) is/are generally associated with improved air flow characteristics over the aircraft's wing at higher angles of attack.

In general, such devices can include a control unit that causes a main drive unit to produce rotation of a shaft or "torque tube". This rotation can then be converted to flap extension in known manners such as by use of a ball screw actuator. In such systems, each flap typically includes two actuators, one for each side of the flap.

In some cases, one or more flaps or slats panels are joined together so they extend and retract as a unit. In such cases, the flaps/slats are joined together and can include a common driveline (e.g., torque tube) that receives power from a common power distribution unit (e.g., PDU). If a slat or flap disconnects from the extending and retracting mechanisms, a slat disconnect sensor (SDS) is triggered, sending a discrete signal to a control unit of a secondary flight surface breakaway.

A conventional SDS is mounted on one panel while the other panel contains a striker pin that provides adequate clearance to the arms of the SDS under normal differential panel deflections. If the relative movement between panels exceeds the predetermined level, the striker pin will contact one of the arms of the SDS and break a link formed between the arms. The status of the link is monitored constantly and currently requires wires connected to the link.

BRIEF DESCRIPTION

Disclosed in one embodiment is a control surface disconnect detection system. The system of this embodiment includes a mechanical disconnect detection device that includes: a first contact element; a second contact element; and a mechanical fuse that includes a conduction path. In a normal operational state the conduction path creates an electrical pathway between the first contact element and second contact element and when in a control surface disconnected state the conduction path does not create an electrical pathway between the first contact element and the second contact element. The system of this embodiment also includes a radio frequency identification (RFID) tag connected to the first contact element and the second contact element such that when the mechanical disconnect detection device is in the normal operation state the RFID tag does not transmit information, and when the mechanical disconnect detection device is in the control surface disconnected state the RFID tag does transmit information.

In any prior disclosed embodiment, the antenna has first and second portions, the first portion being connected to the first contact element and the second portion being connected to the second contact element.

In any prior disclosed embodiment, when the mechanical disconnect detection device is in the normal operation state, the two portions are electrically connected to one another through the conduction.

In any prior disclosed embodiment, when the mechanical disconnect detection device is in the control surface disconnected operation state, the two antenna portions are not electrically connected to one another through the conduction path.

In any prior disclosed embodiment, the mechanical fuse is broken when the mechanical disconnect detection device is in the control surface disconnected operation state.

In any prior disclosed embodiment, when the mechanical disconnect detection device is in the control surface disconnected state the RFID tag transmits information that identifies the control surface to which a portion of the mechanical disconnect detection device is attached.

In any prior disclosed embodiment, the control surfaces are slats.

In any prior disclosed embodiment, the control surfaces are flaps.

In one embodiment, a method of determining that control surfaces of an aircraft have become disconnected utilizing a mechanical disconnect detection device that includes a first contact element, a second contact element, and a mechanical fuse that includes a conduction path, wherein in a normal operational state the conduction path creates an electrical pathway between the first contact element and second contact element and when in a control surface disconnected state the conduction path does not create an electrical pathway between the first contact element and the second contact element is disclosed. The method includes: coupling an RFID tag to the first contact element and the second contact element such that when the mechanical disconnect detection device is in the normal operation state the RFID tag does not transmit information and when the mechanical torque sensor is in the over torque operation state the RFID tag does transmit information; and receiving, at an RFID reader, information from the RFID tag.

In any prior method, the RFID reader sends the interrogation signal during a flight and receives the information back during the flight.

In any prior method, the RFID reader is located within the aircraft.

In any prior method, the RFID reader sends the interrogation after the conclusion of a flight while the aircraft is on the ground.

In any prior method, the RFID reader is located outside of the aircraft.

In any prior method, the antenna has first and second portions and coupling further comprises: connecting the first portion to the first contact element and connecting the second portion to the second contact element.

In any prior method, when the mechanical disconnect detection device is in the normal operation state, the two antenna portions are electrically connected to one another through the conduction path.

In any prior method, the method further includes: sending an interrogation signal form the RFID reader to the RFID tag that causes the RFID tag to transmit information.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As discussed generally above, slat/flap disconnect sensors are known. In general, there are two different ways in which the link between the arms can be formed. One includes a potted glass reed switch and magnet. The other incudes an isolated conductive fuse. Both designs require wiring and connecters that are susceptible to water ingress and corrosion due to the SDS location on the aircraft wing. Disclosed herein is a sensor system and method that unitizes one or more RFID tags to determine whether the fuse line between the arms has been broken. Such a design can achieve a technical effect of removing the aforementioned wiring and connectors and result in increased time between failures and reduced cost of one or both of maintenance and installation as no wires are needed.

Figure 1:
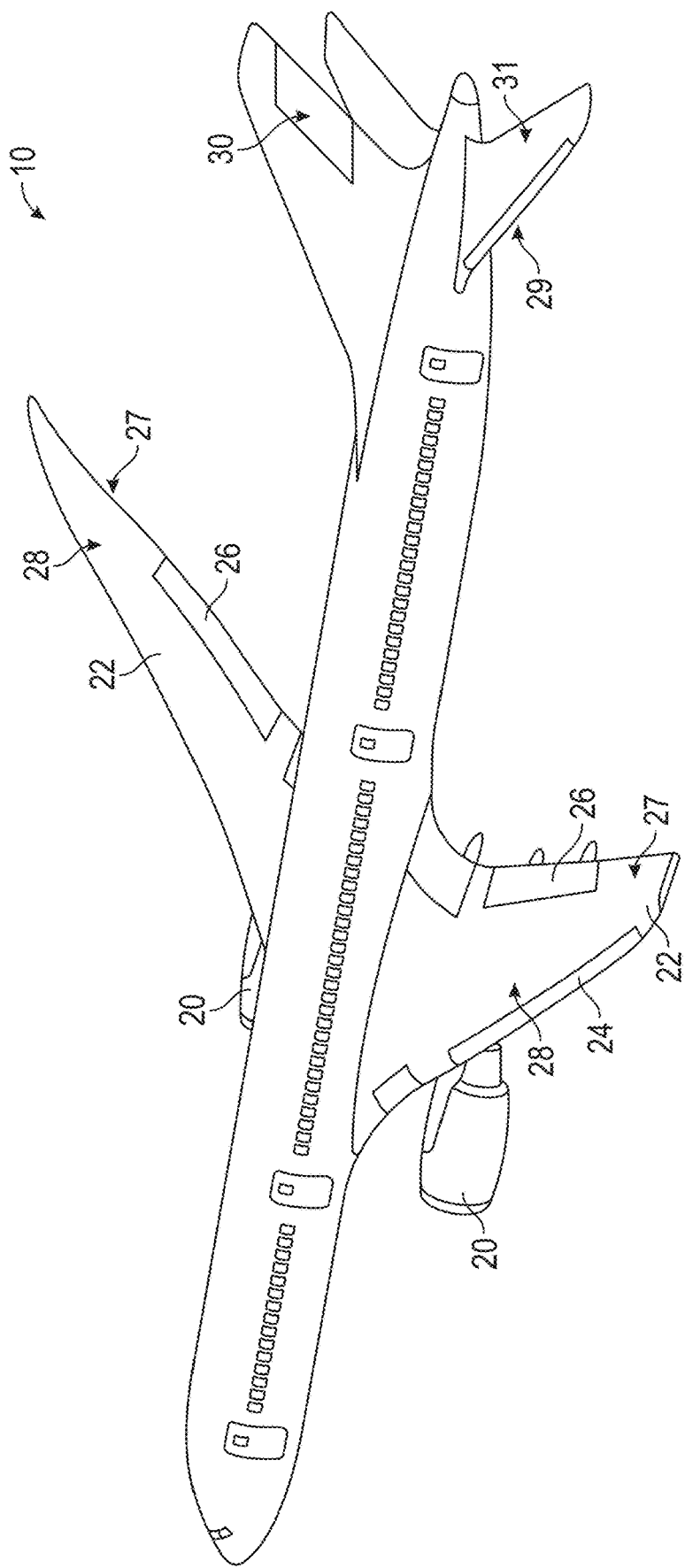
FIG. 1 shows an example of an aircraft on which embodiments disclosed herein can be implemented.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described. It will be understood that the slats 24 and/or the flaps 26 can include one or more slat/flap panels that move together.

Figure 2:
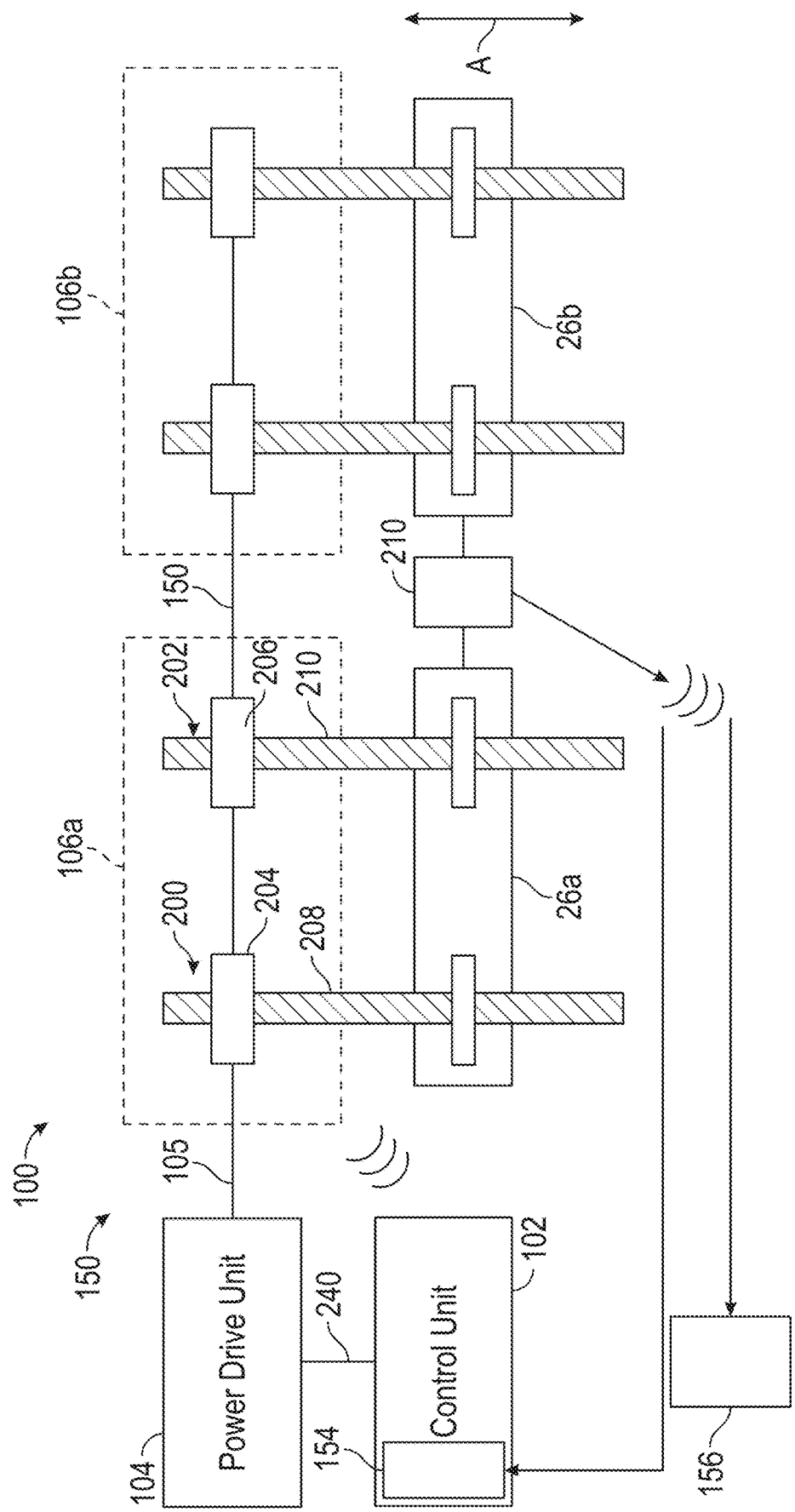
FIG. 2 shows an example configuration of actuators having a control surface disconnect detection system according to one embodiment.

FIG. 2 illustrates, generally, a system 100 that can control and monitor the location of one or more control surfaces of an aircraft. As illustrated, the control surfaces are flaps 26. In particular, two flaps 26a, 26b are illustrated but any number of flaps could be controlled and monitored by the system 100. Further, while flaps 26 are illustrated, the same teachings herein can also be applied to slats 24 and other control surfaces.

The system includes a power drive unit 104 (or drive unit for short). The drive unit 104 can cause a rotation of a drive shaft 105 in order to simultaneously move flaps 26a, 26b in either direction in or out as generally indicated by arrow A. To convert the rotary motion of the drive shaft 105 into linear motion to move the flaps 26, actuator units 106a, 106b\n are provided, with each flap or other control surface having its own actuator unit 106.

As illustrated, each actuator unit 106 includes two actuators. For example, a first actuator unit 106a includes first and second actuators 200, 202. However, this is not required and each slat can have a single actuator or three or more actuators.

In the illustrated embodiment, the first actuator 200 includes an actuator drive unit 204 and a linear translation element 208. The actuator drive unit 204 receives rotatory motion from the drive shaft 105 and causes the linear translation element 208 to move linearly in the direction shown generally by arrow A. Similarly, the second actuator 202 includes an actuator drive unit 206 and a linear translation element 210. The actuator drive unit 206 also receives rotatory motion from the drive shaft 105 and causes the linear translation element 210 to move linearly in the direction shown generally by arrow A. In one embodiment, the linear translation units 208, 210 are ball screws. In another, they may be hydraulic or rotary actuators or any other type of electromechanical actuators.

Connected between the two flaps is control surface disconnect sensor 211. In the configuration of FIG. 2, the control surface disconnect sensor 211 is connected to flaps 26a, 26b. Of course, the control surface disconnect sensor 211 could be connected to two slats in another embodiment. The control surface disconnect sensor 211 (as explained more fully below) includes moveable arms that are connected by a physical link that allows for electrical conduction when closed. In addition, the control surface disconnect sensor 211 includes one or more RFID elements. One of the one or more RFID elements is used in combination with the link to send a wireless indication when the flaps 26a, 26b movement relative to each other exceeds a predetermined level. In one embodiment, the indication can also identify the flaps 26a, 26b, etc. where the error condition exist. The identification can be done by a single RFID element or by a second RFID element. The indication and/or identification can occur during flight (e.g., by the RFID communication portion 154 of the control unit 102) or by an external RFID reader 156 while the aircraft is on the ground or both.

As will be more fully disclosed below, embodiments herein can have a technical effect allowing for the wireless communication of a control surface disconnect without having to provide wires for transmission of power and data to a control surface disconnect sensor located in an aircraft wing. Such an effect can be realized because the breaking of the link (e.g., the link no longer conducts electricity) between the sensor disconnect arms will cause an RFID element to be enabled to transmit information to an RFID reader such as reader 156 or RFID communication portion 154. This is done because when the joined control surfaces are moving together within tolerances, the link serves to electrically connect and thereby disable the antennas of an RFID element (or RFID tag). Further, embodiments herein can also accomplish one or more of these effects while adding almost no weight to the aircraft because the RFID tags do not require external wiring. In the event that the RFID is a passive tag, the RFID reader may send an interrogation signal that causes the RFID to transmit information to the reader.

The controller 102 issues commands to cause the drive unit 104 to rotate shaft 105. The rotation causes linear motion of the linear translating elements 208, 210. Such a command should cause both flaps 26a, 26b to move the same amount. Of course, some predetermined relative movement between the flaps is acceptable.

Figure 3A:
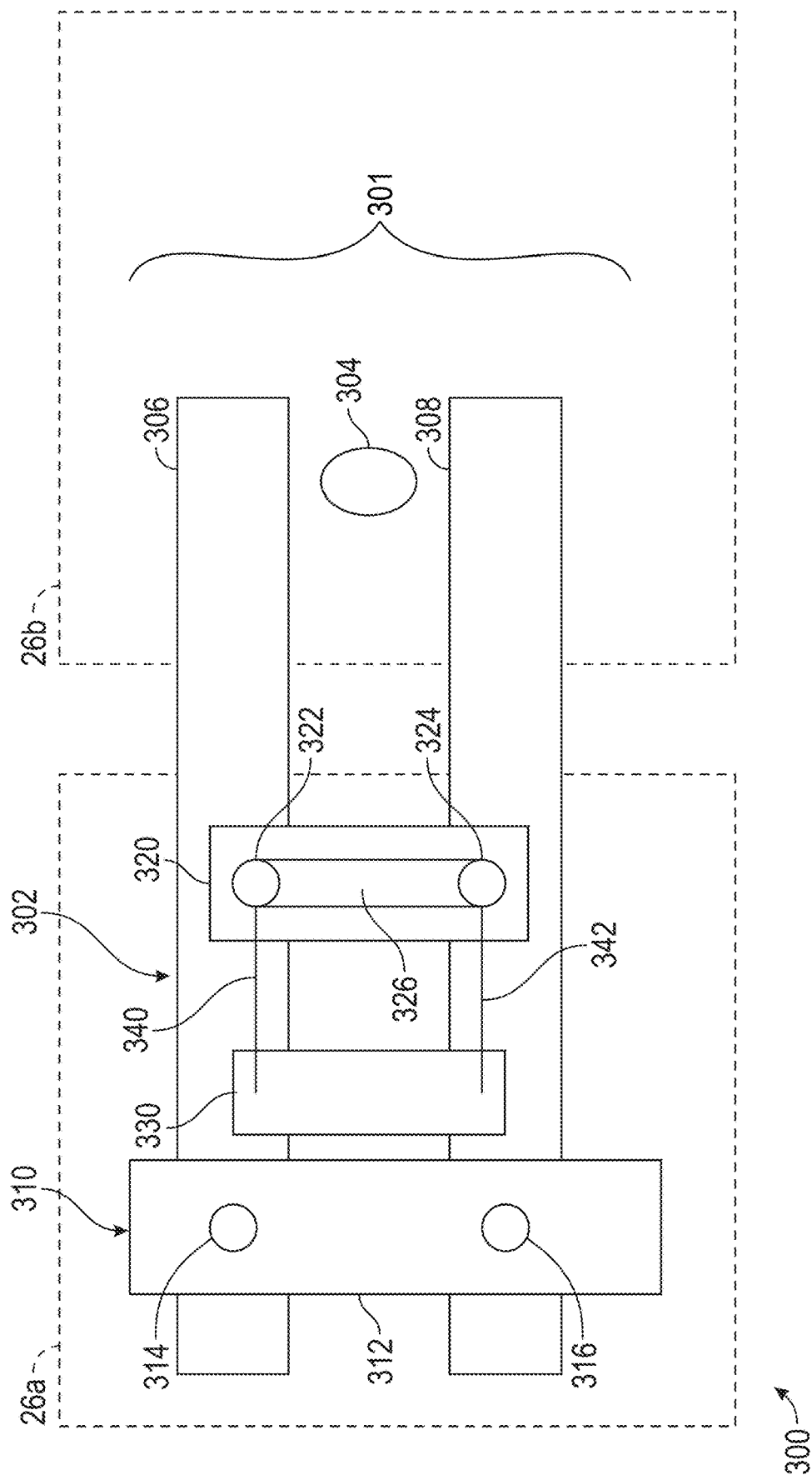
FIGS. 3A and 3B show a control surface disconnect detection system according to one embodiment in both a closed (normal operating) state and an open (over torque) state, respectively.
Figure 3B:
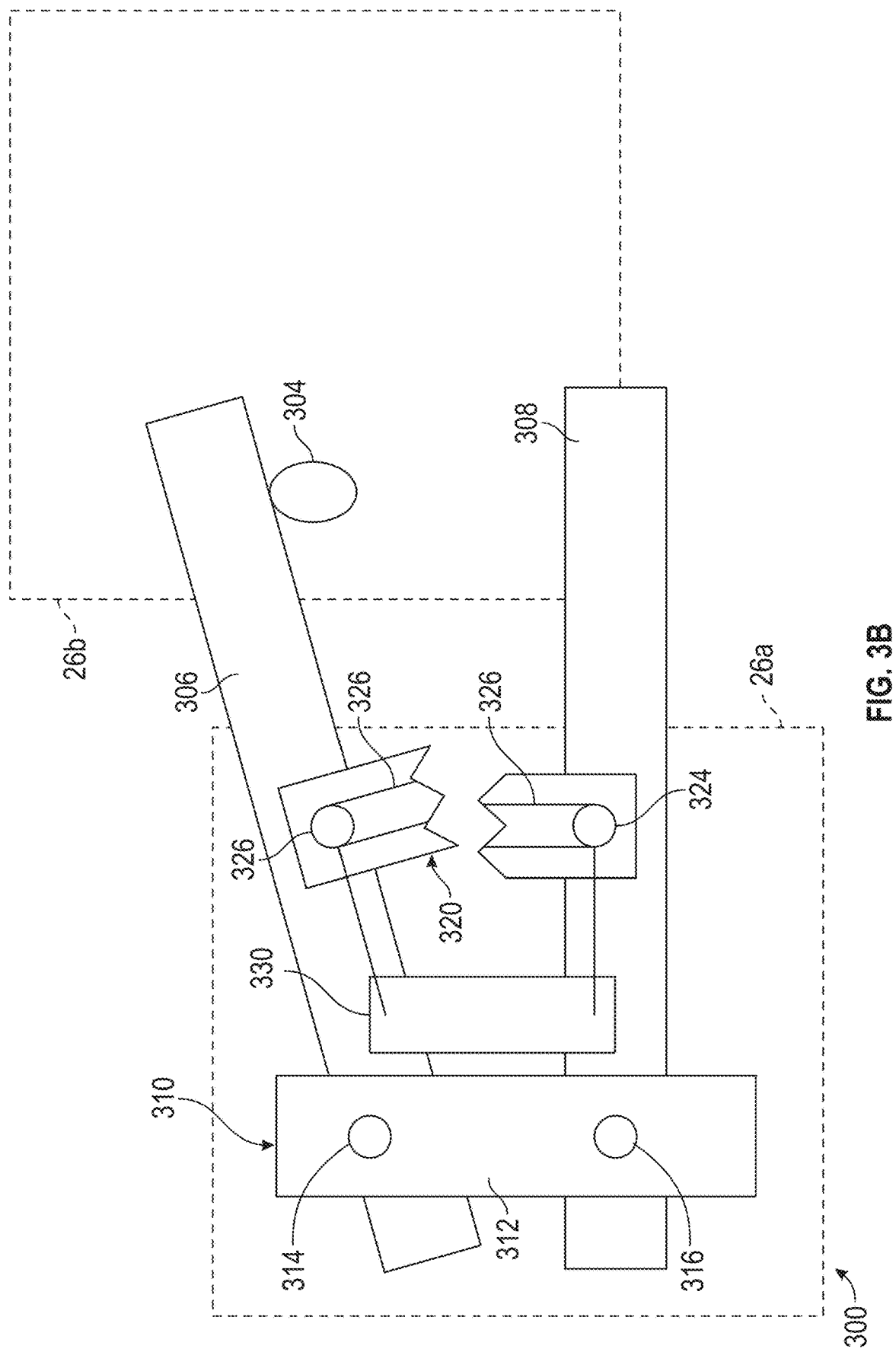

Referring now to FIGS. 3A and 3B, an example disconnect sensor system 300 is disclosed. The system 300 determines when two control surfaces (e.g., flaps 26a, 26b) have moved beyond tolerances relative to one another.

As shown, the system 300 includes a mechanical disconnect detection device 301 having two portions, a first portion 302 and second portion 304. The first portion 302 is fixedly connected to a first control surface (flap 26a) and the second portion 304 is fixedly connected to a second control surface (flap 26b). The second portion 304 can be implemented as a pin, rod or other rigid member.

The first portion 302 includes at least two arm 306, 308 that can move relative to one another. Any type of connection assembly that allows for such motion can be provided and is within the scope of embodiments disclosed herein. As illustrated, a connection assembly 310 includes a solid member 312 with first and second fasteners 314, 316 that fasten the arms 306, 308, respectively, to the solid member 312.

The two arms are joined together by a mechanical fuse 320. The fuse 320 includes first and second contacts 322, 324 on either end of a conduction path 326.

As shown in FIG. 3B, movement of the control surfaces 26a, 26b relative to one another can result in one of arms 306 contacting the second portion 304 of the mechanical disconnect detection device 301. In such case, the arm 306 is moved away from the other arm 308 and the fuse 320 is broken. Breaking the fuse causes a break in the conduction path 326 and can serve to electrically isolate the first and second contacts 322, 324 from one another.

The system 300 also includes an RFID tag 330. The RFID tag 330 is connected to the first and second contacts 324, 326 by connections 340, 342, respectively. In the configuration shown in FIG. 3A (e.g., in a normal operational state) the connections 340, 342 are electrically coupled to one another. In the configuration shown in FIG. 3B (e.g., in control surface disconnect state) the connections 340, 342 are not electrically coupled to one another.

Figure 4:
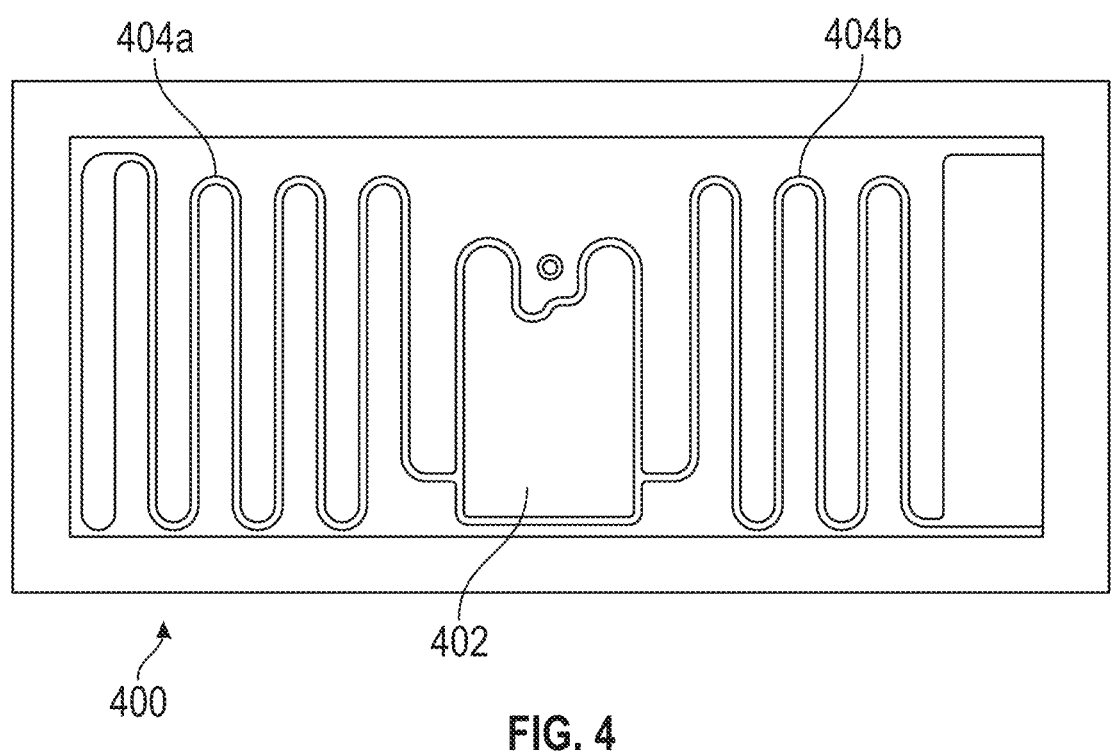
FIG. 4 shows an example of an example RFID tag.

FIG. 4 shown an example of an RFID tag 400. The tag 400 could be, for example, tag 330 shown in FIGS. 3A and 3B.

The tag 400 includes a controller 402 and an antenna 404. In general, if the RFID tag 400 is a passive tag it collects energy from a nearby RFID reader's interrogating signal (e.g., radio waves) via the antenna 404. The controller 402 can include a storage element to store power received by the antenna 404. The storage element can then provide power to logic and other circuitry that are used to drive the antennas to send a signal back to the reader (e.g., reader 156 or RFID communication portion 154 in FIG. 2). The signal can include an identification of the tag/actuator that it is coupled to in one embodiment. In the event the RFID tag is an active tag, it may include a battery to provide the required power. In either case, the tag information is stored in a non-volatile memory. The RFID tag 400 can include either fixed or programmable logic for processing the transmission and sensor data, respectively.

In one embodiment, the antenna 404 includes two portions 404a, 404b. Herein, when these two portions are connected together, the RFID tag 400 is in the so-called "disabled state" and cannot transmit information.

Figure 5A:
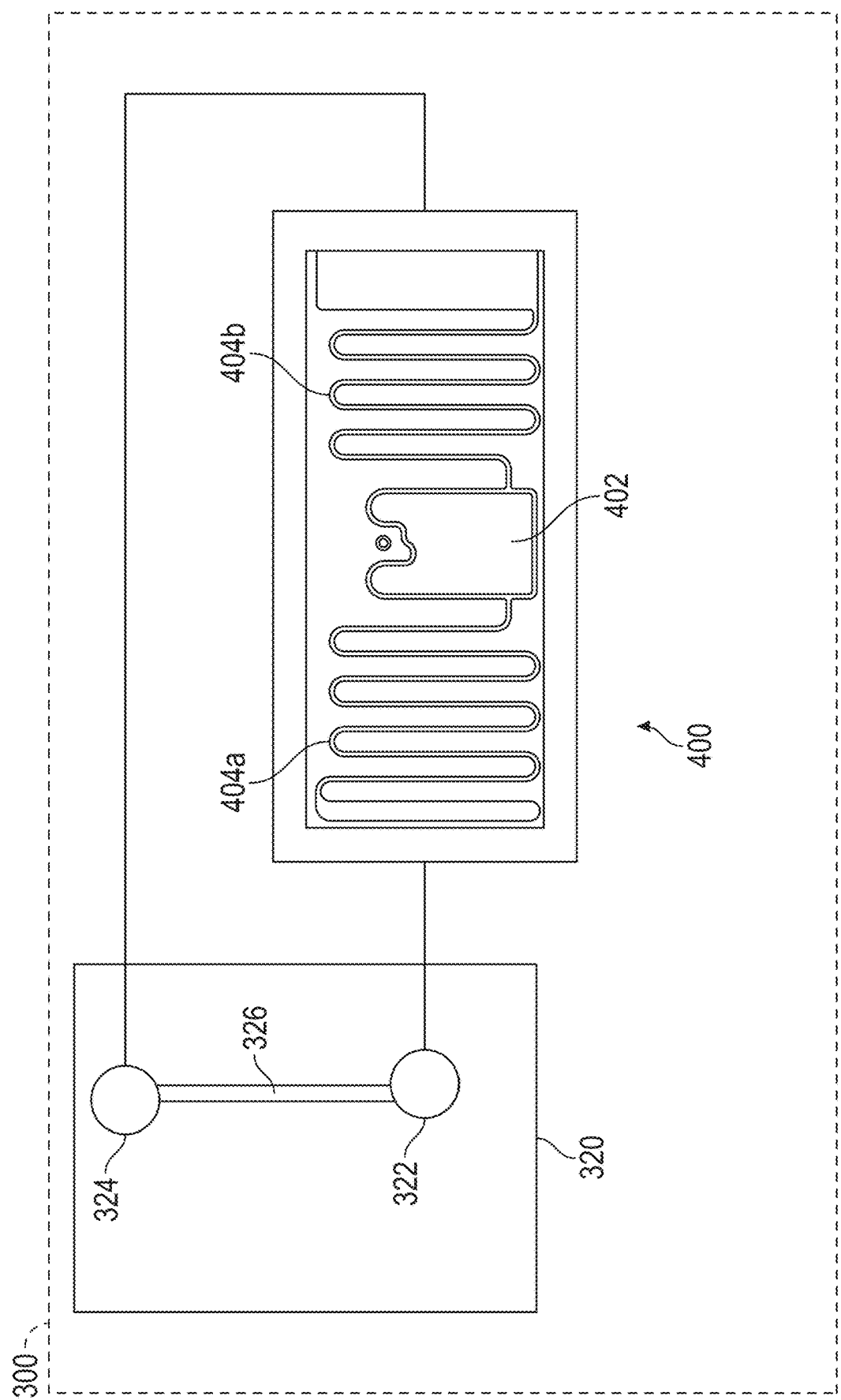
FIGS. 5A and 5B show an RFID tag connected to a control surface disconnect detection system according to one embodiment in a closed (normal operating) state and an open (over torque) state, respectively.

As shown in FIG. 5A, in one embodiment, the RFID tag 400 is connected to the first contact element 322 and the second contact element 324. As such, the combination of the RFID tag 400 and the contacts 322, 324 (and the conduction path 326 of the fuse 320) form a control surface sensor 300 according to one embodiment.

As shown, a first antenna portion 404a is connected to first contact element 322 and a second antenna portion 404b is connected to the second contact element 334 of FIGS. 3A and 3B. Of course, the connections could be reversed and second antenna portion 404b would be connected to first contact element 322 and first antenna portion 404a would be connected to second contact element 324.

Regardless, as shown, the conduction path 326 is electrically coupling the first antenna portion to the second antenna portion to place the RFID tag 400 in the disabled state so it cannot transmit information.

Figure 5B:
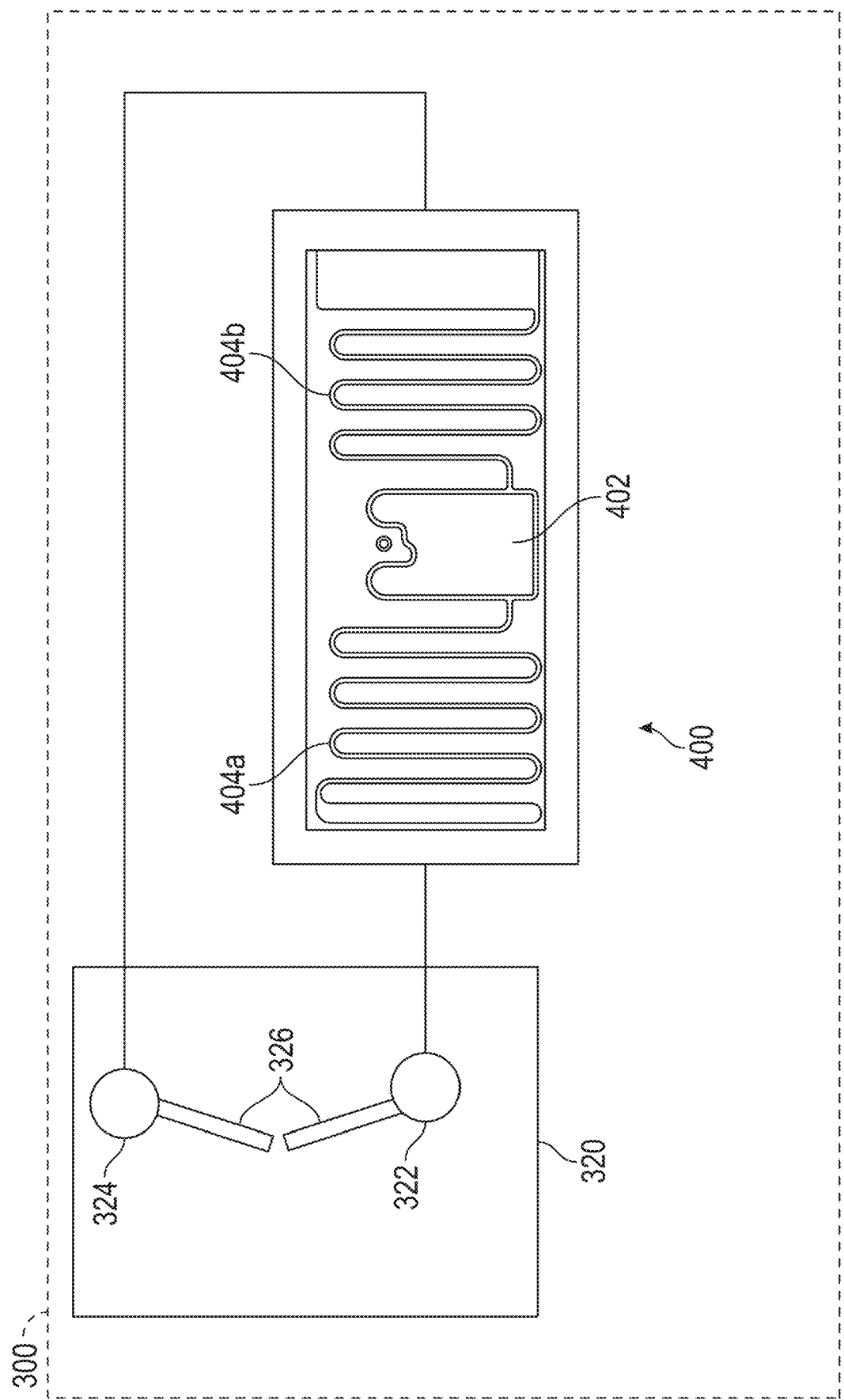

As shown in FIG. 5B, the first antenna portion 404a is connected to first contact element 322 and the second antenna portion 404b is connected to the second contact element 334 of FIGS. 3A and 3B. Here, the conduction path 326 has been broken and electrically is no longer coupling the first antenna portion to the second antenna portion to place the RFID tag 400 in the disabled state. In such a case, the RFID tag 400 is operative and can transmit information. This configuration occurs when, for example, the sensor 300 is in the state shown in FIG. 3B.

As will be understood based on the above discussion, when the mechanical disconnect detection device 301 "opens" (e.g., the arms 306, 308 have move such that fuse 320 is broken) as shown in FIG. 3B, the fuse 320 is not establishing an electrical pathway between the first and second contact elements 322, 324 and the RFID tag 400 can inform any RFID reader on the aircraft or on the ground that an over torque condition is occurring or has occurred. Further, while operating under normal conditions, the RFID tag is shorted and does not provide a response to a reader.

Figure 6:
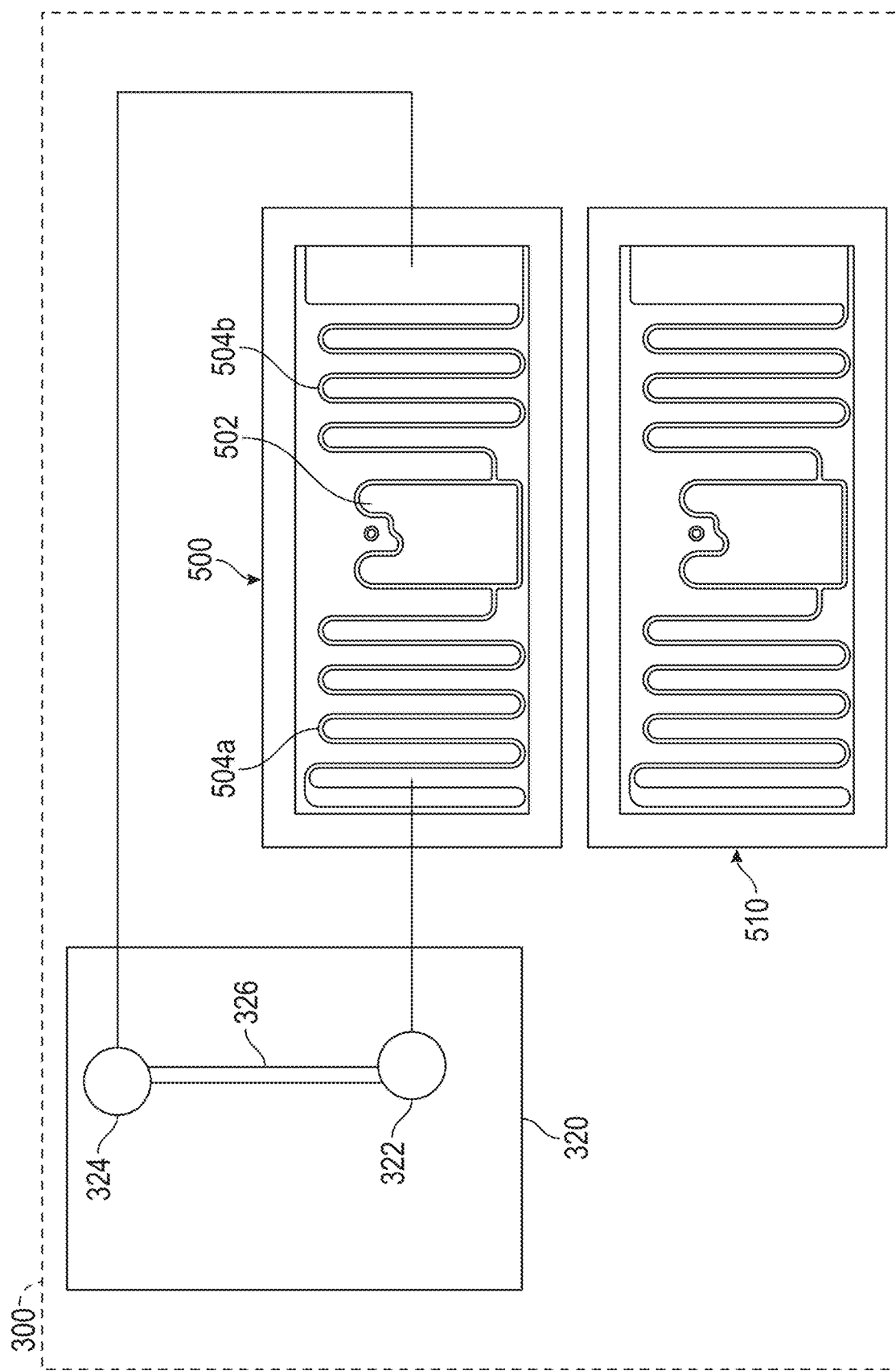
FIG. 6 shows an embodiment of a control surface disconnect detection system according to one embodiment that includes two RFID tags.

It will be understood that in another embodiment, two RFID tags 500, 510 can be provided as shown in FIG. 6. The first RFID tag 500 may operate in the same manner as described above and includes controller 502 and antennas 504a, 504b. In this embodiment, the first RFID tag 500 only provides an indication of an error. Other identification information can come from the second RFID tag 510. Such information can be used to determine all actuators present in the system and then, when the first RFID tag 500 begins to operate, which actuator has experienced an over torque situation.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft control surface disconnect detection system, the system comprising:
   a mechanical disconnect detection device that includes a first portion that includes:
      a first contact element located on a first arm;
      a second contact element located on a second arm; and
      a mechanical fuse that includes a conduction path;
      wherein the mechanical disconnect detection device is in a normal operational state the conduction path creates an electrical pathway between the first contact element and second contact element and when the mechanical disconnect detection device is in a control surface disconnected state the conduction path does not create an electrical pathway between the first contact element and the second contact element; and
   a radio frequency identification (RFID) tag electrically connected to the first contact element and the second contact element such that when the mechanical disconnect detection device is in the normal operation state an antenna of the RFID tag is disabled and does not transmit information, and when the mechanical disconnect detection device is in the control surface disconnected state the antenna of the RFID tag is enabled to transmit information;
   wherein the first portion is mounted to a first aircraft flight control surface and the mechanical disconnect detection device further includes a second portion mounted to a separate second aircraft flight control surface and disposed between the first and second arms, wherein relative motion between the first and second aircraft flight control surfaces causes one of the first and second arms to contact the second portion and causes the mechanical disconnect detection device to switch from the normal operational state to the control surface disconnected state.

2. The system of claim 1, wherein the antenna has first and second portions, the first portion of the antenna being connected to the first contact element and the second portion of the antenna being connected to the second contact element.

3. The system of claim 2, wherein when the mechanical disconnect detection device is in the normal operation state, the first and second antenna portions are electrically connected to one another through the conduction path.

4. The system of claim 2, wherein when the mechanical disconnect detection device is in the control surface disconnected operation state, the first and second antenna portions are not electrically connected to one another through the conduction path.

5. The system of claim 4, wherein the mechanical fuse is broken when the mechanical disconnect detection device is in the control surface disconnected operation state.

6. The system of claim 1, wherein when the mechanical disconnect detection device is in the control surface disconnected state the RFID tag transmits information that identifies the control surface to which a portion of the mechanical disconnect detection device is attached.

7. The system of claim 1, wherein the first and second aircraft flight control surfaces are aircraft slats.

8. The system of claim 1, wherein the first and second aircraft flight control surfaces are aircraft flaps.

9. A method of determining that control surfaces of an aircraft have become disconnected, the method comprising:
   coupling the mechanical disconnect detection device as recited in claim 1 to the aircraft control surfaces;
   coupling the RFID tag to the first contact element and the second contact element such that when the mechanical disconnect detection device is in the normal operation state the antenna of the RFID tag is disabled and does not transmit information and when the mechanical disconnect detection device is in the control surfaces disconnected state the antenna of the RFID tag is enabled does transmit information; and
   receiving, at an RFID reader, information from the RFID tag.

10. The method of claim 9, wherein the RFID reader sends an interrogation signal during a flight and receives the information back during the flight.

11. The method of claim 10, wherein the RFID reader is located within the aircraft.

12. The method of claim 9, wherein the RFID reader sends an interrogation after the conclusion of a flight while the aircraft is on the ground.

13. The method of claim 12, wherein the RFID reader is located outside of the aircraft.

14. The method of claim 9, wherein the RFID tag includes an antenna having first and second portions and coupling further comprises:
   connecting the first portion of the antenna to the first contact element and connecting the second portion of the anteanna to the second contact element.

15. The method of claim 14, wherein when the mechanical disconnect detection device is in the normal operation state, the first and second antenna portions are electrically connected to one another through the conduction path.

16. The method of claim 9, further comprising:
   sending an interrogation signal from the RFID reader to the RFID tag that causes the RFID tag to transmit information.

* * * * *